Patented June 5, 1934

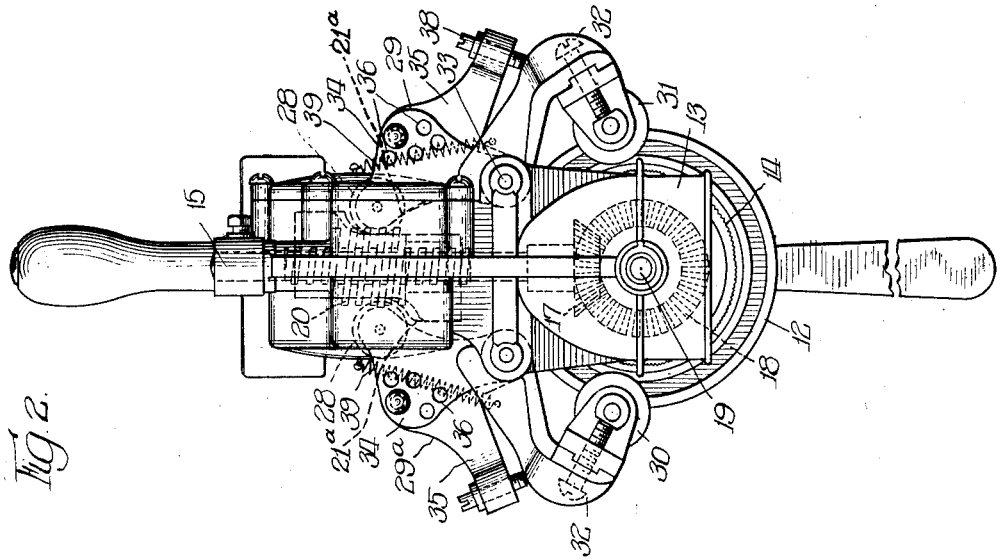

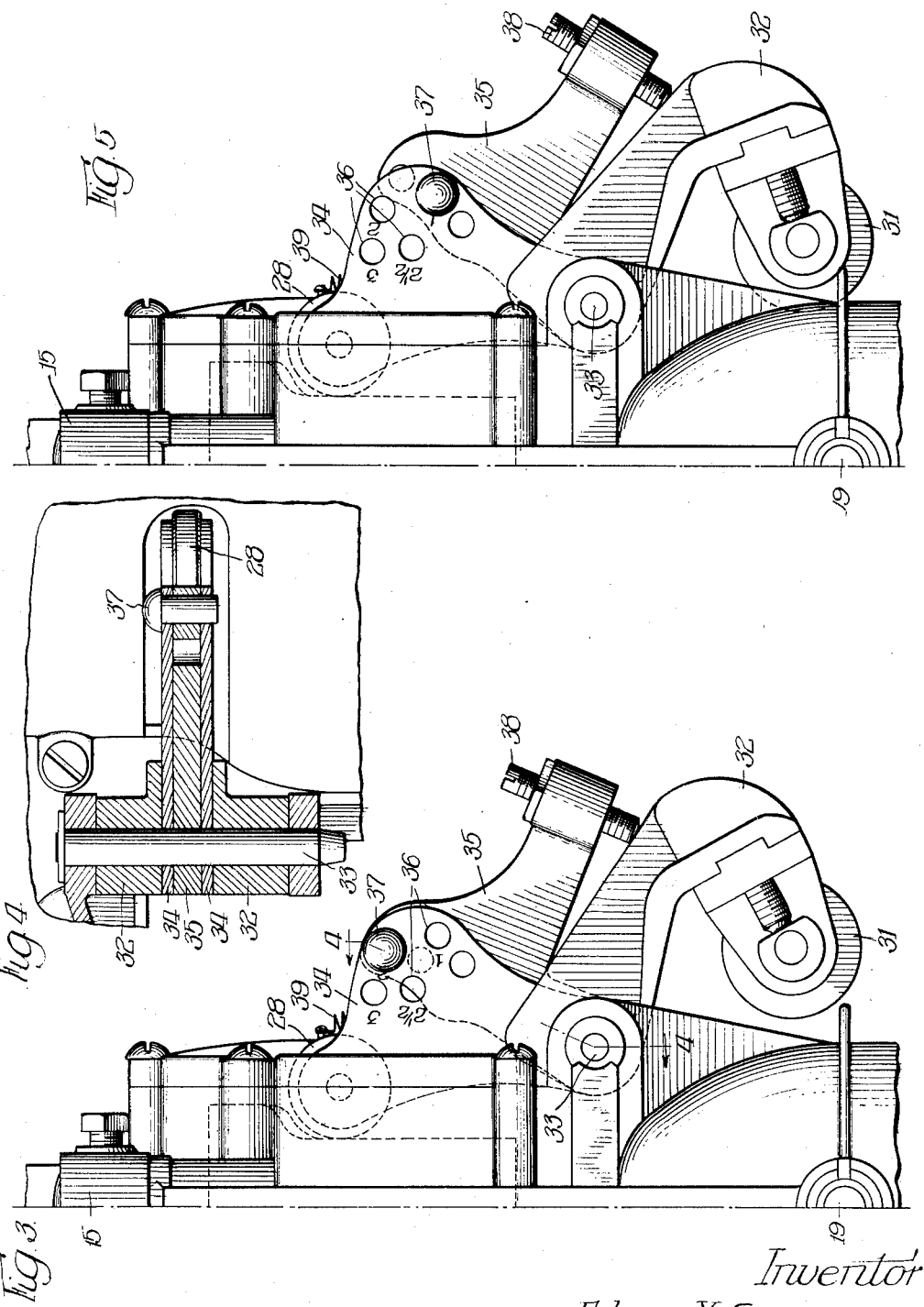

1,961,650

UNITED STATES PATENT OFFICE 1,961,650

PORTABLE CAN SEALING MACHINE

Edwin V. Swangren, Maywood, Ill., assignor to James P. Dowell, McKinney, Tex.

Application January 7, 1932, Serial No. 585,235

9 Claims. (Cl. 113—23)

The present invention relates to portable canning machines and particularly to that portion of such machines having to do with the adjustment of the seaming rollers so that the machine can be used to seal cans of various diameters.

In connection with home canning machines used for sealing tin cans it is desirable to be able to adjust the machine to seal various sizes of cans. For this purpose complicated adjusting means have been designed in the past which are not particularly desirable or satisfactory because of their complicated nature or because in many instances they are not accurate and require either some skill or judgment on the part of the user of the machine in making the adjustments.

An accurate and positive adjustment of the machine is absolutely essential for successful canning operations for if the seaming rollers are improperly adjusted even to the point of a fraction of an inch an imperfect seam results which, although it may not be visible from an outward inspection of the sealed can, will permit the entrance of air to the canned food thus causing it to become putrid and in some cases poisonous.

The object of this invention is to provide an adjusting means which is exceedingly simple to operate, is accurate and requires no skill or judgment on the part of the operator in changing the machine for operation on cans of one diameter to cans of another diameter.

Other objects and advantages of the invention will be obvious to those skilled in the art upon understanding this specification and the preferred form of the invention shown in the accompanying drawings.

It is to be understood, however, that this disclosure is for illustrative purposes only and is not to be construed as unnecessarily limiting the scope of the invention defined by the appended claims.

Referring to the drawings:

Fig. 1 discloses the complete machine on side elevation with portions of the interior mechanism shown by dotted lines;

Fig. 2 is a top plan view which likewise has portions of the interior mechanism shown by dotted lines;

Fig. 3 is an enlarged detailed view of the adjusting mechanism;

Fig. 4 is a sectional view taken on the line 4—4 of Fig. 3; and

Fig. 5 is a top plan detailed view showing the machine set in a different adjustment position from Fig. 3.

The general layout of the machine consists of a frame member 11 to which is attached an adjustable base plate 12, a head 13 which is at the top of the frame member 11 and a driving chuck 14 mounted in the head 13 which is connected through intermediate gearing to the handle 15. A detailed discussion of the general construction of the machine will not be given as the invention is adaptable to structures which, in their general layout, are of different form than that disclosed in the drawings.

Referring to Fig. 1 it will be seen that connected to the handle 15 is a shaft 16 that extends through to the head of the machine and drives the beveled gear 17. The beveled gear 17 drives a second beveled gear 18 which is mounted on the chuck spindle 19 and the chuck 14 is fixedly secured to the chuck spindle 19. Consequently rotation of the handle 15 causes rotation of the chuck plate 14.

Mounted on the drive shaft 16 is a worm gear 20 which drives the seaming roller gear 21. The gear 21, as shown in Figs. 2, 3 and 5, has on both sides thereof cam-shaped surfaces 21$^a$ which cooperate with the rollers 28 to impart movement to the seaming mechanisms 29 and 29$^a$ as the rollers ride over the cam-shaped surfaces of the member 21.

The seaming mechanisms 29 and 29$^a$ are identical in construction except that the seaming rollers 30 and 31 have different shaped flanges to perform separate operations in connection with the sealing of the lid on the can.

The seaming rollers are rotatably mounted on arms 32, the inner ends of which arms are pivotally secured to the frame 11 by means of the bolt 33 as shown in detail in Fig. 4. The central portions of the arms 32 are bifurcated to receive the adjusting member 34 which is likewise pivotally mounted on the frame 11. On the opposite end of the adjusting member 34 is mounted the cam roller 28.

The adjusting member 34 consists of two flat plates spaced apart a sufficient distance to receive the adjusting arm 35 which arm fits between the flat plates 34 and is pivotally mounted on the spindle 33 so that the adjustment arm 35 may be moved laterally relative to the adjusting plates 34. The adjusting plates 34 are provided with a plurality of perforations 36 which are adapted to receive a bolt 37. Likewise, the adjusting arm 35 is provided with a plurality of openings, one of which will register with one of the openings in the adjusting member 34 to likewise receive the bolt 37 to prohibit relative movement of the two members. The adjusting arm 35 is provided at its outer end with a bolt 38 which bears against the seaming roller arm 32. The purpose of this bolt will be hereinafter described.

A spring member 39 is connected at one end to the seaming roller arm 32 and at its opposite end to the frame 11 to keep the seaming roller arm 32 into engagement with the bolt 38, as appears in dotted lines in Fig. 2.

It will be observed from Figs. 3 and 4 that the top adjusting plate member 34 which is provided with the plurality of holes above referred to has opposite each of said holes a can size number. Consequently, if it is desired to seal a No. 3 can the bolt 37 is removed and the adjusting arm 35 is moved relative to the adjusting plates 34 until a hole in the adjusting arm 35 is in juxtaposition with the hole in the adjusting plates 34, the bolt 37 is then inserted in this hole as shown in Fig. 3. The holes in the adjusting arm 35 are so spaced that it is only possible for one of them to be in juxtaposition with a single hole in the adjusting plate 34. Thus it is impossible for the bolt 37 to be inserted except when the proper holes are in juxtaposition for if the No. 3 size can hole is in juxtaposition with its complementary hole in the arm 37 all of the other holes would be partially or entirely closed.

In the operation of the device the seaming rollers are adjusted to the proper size can as mentioned in the preceding paragraph. The handle 15 is rotated which causes the chuck 14 to rotate through the operation of the intermediary shaft 16 and the beveled gears 17 and 18 and the spindle 19. The top of the can is seated in the chuck 14 and the can is rotated.

Obviously, rotation of the shaft 16 causes the worm gear 20 to rotate and since this worm engages the cam gear 21 the latter also rotates. The rollers 28 riding on the cam 21, which are forced into engagement therewith by the spring 39, will ride thereon and alternately force the seaming rollers 30 and 31 inwardly toward the can.

Due to the spacing of the holes in the adjusting plates 34 and the arm 35 it is impossible for the seaming rollers to be improperly adjusted. Furthermore, there is no necessity for judgment on the part of the operator for he merely selects the hole on the adjusting plate 35 which has the number of the desired size can adjacent it and adjusts the arm 35 until one of the holes is in juxtaposition with the first mentioned hole. He then inserts the bolt 37 and is ready to operate the device. There is no screw adjustment requiring his attention. Consequently, there is positive assurance of a perfect seam being formed.

Since there is some wear in the mechanism over an extended period of use which should be compensated for, the adjusting screw 38 is provided. This screw is set at the factory when the machine is made. It is not again touched until wear occurs at which time the wear can be compensated for by taking up the screw a few turns.

The device is simple, conveniently manufactured and assembled, positive and accurate in operation.

I claim:

1. In a can sealing machine the combination of a frame member, a seaming roller, an arm pivotally mounted on said member and carrying said seaming roller, a pair of adjusting plates pivotally mounted on said frame, an adjustment arm coaxially mounted on said frame with said adjusting plates, means for prohibiting relative movement of said adjustment plates to said adjustment arm and means for forcing said adjustment arm into engagement with said seaming roller through said adjustment plates.

2. In a can sealing machine the combination of a frame member, an arm pivotally mounted on said frame member and carrying said seaming roller, an adjusting member coaxially mounted with said arm and an adjusting arm likewise coaxially mounted with the first mentioned arm, said adjusting arm and adjusting plate having a plurality of openings therein so spaced that no two of them will be in register at the same time and means for affixing said arm and plate relative to each other.

3. In a can sealing machine the combination of a frame member, an arm pivotally mounted on said frame member, a seaming roller carried by said arm, a second member coaxially mounted with said arm and a third member likewise coaxially mounted with said arm, means for affixing the relative position of said second member and said third member, and means for exerting pressure on said first member which is transmitted to said arm to force the seaming roller into engagement with a can flange.

4. In a can sealing machine the combination of a frame member, an arm pivotally mounted on said frame member, a seaming roller carried by said arm, two other members coaxially mounted with said arm and adapted to move relative to one another, one of said members engaging said arm, a cam member adapted to engage the other of said members, means for varying the relative position of said members, and a resilient member affixed to said arm and said frame to withdraw said seaming roller from engagement with a can flange.

5. In a can sealing machine the combination of a frame member, means pivotally mounted on said frame member for supporting a seaming roller, an adjusting plate member and an adjusting arm member movable relative to each other but both coaxially mounted with said first mentioned member, a cam member, a roller mounted on said adjusting plate member and adapted to engage said cam member, a resilient member for urging said adjusting members into engagement with said cam members, said adjusting plate and adjusting arm each being provided with a plurality of openings so spaced that only one in each member are in register at predetermined positions, and means for fastening said adjusting plate to said adjusting arm member.

6. In a portable can sealing machine the combination of a frame member, a chuck member mounted on said frame member, an arm pivotally mounted on said frame member having a seaming roller mounted thereon, a cam-shaped member, means for rotating said cam-shaped member, adjustable means interposed between said cam-shaped member and said seaming roller for transmitting motion from said cam-shaped member to said seaming roller arm, said adjustable means comprising an arm member coaxially mounted with said first mentioned arm member and bearing against the same and having openings therein at predetermined points and a member for transmitting motion from said cam-shaped member to said second arm member, said member being adapted to be secured to said second mentioned arm member at predetermined points.

7. In a portable can sealing machine the combination of a frame member, a chuck member mounted on said frame member, an arm pivotally mounted on said frame member having a seaming roller mounted thereon, a cam-shaped member, means for actuating said cam-shaped member, adjustable means interposed between said cam-shaped member and said seaming roller for transmitting motion from said cam-shaped member to said seaming roller arm, said adjustable means comprising an arm member coaxially mounted with said first mentioned arm member and bearing against the same and having openings therein at predetermined points, a member for transmitting motion from said cam-shaped member to said second arm member, said member being adapted to be secured to said second mentioned arm member at predetermined points and resilient means for urging said roller arm member into engagement with said second mentioned arm member.

8. In a portable can sealing machine the combination of a frame member, a chuck member mounted on said frame member, an arm pivotally mounted on said frame member, a seaming member mounted on said arm, a cam-shaped member, means for driving said cam-shaped member and adjustable means for transmitting motion from said cam-shaped member to said seaming member, comprising an intermediate arm member coaxially mounted with the arm member upon which said seaming member is mounted and having openings therein, a screw adjustment interposed between said seaming member arm and said intermediate arm member, a third member connecting said cam-shaped member to said intermediate arm member, said third member having an opening therein adapted to coincide with openings in said intermediate arm member which last mentioned openings are arranged at predetermined points so that said seaming member may be adjusted for operation upon various sizes of cans.

9. In a portable can sealing machine the combination of a frame member, a chuck member mounted on said frame member, an arm pivotally mounted on said frame member, a seaming member mounted on said arm, a cam-shaped member, means for driving said cam-shaped member and adjustable means for transmitting motion from said cam-shaped member to said seaming member, comprising an intermediate arm member coaxially mounted with the arm member upon which said seaming member is mounted and having openings therein, a screw adjustment interposed between said seaming member arm and said intermediate arm member, a third member connecting said cam-shaped member to said intermediate arm member, said third member having an opening therein adapted to coincide with openings in said intermediate arm member which last mentioned openings are arranged at predetermined points so that said seaming member may be adjusted for operation upon various sizes of cans and resilient means for urging said seaming member arm into engagement with said intermediate arm.

EDWIN V. SWANGREN.